（12）United States Patent
Furukawa et al.

(10) Patent No.: US 9,259,677 B2
(45) Date of Patent: Feb. 16, 2016

(54) DYNAMO-ELECTRIC MACHINE PROVIDED WITH GAS PURITY MAINTAINER

(75) Inventors: Masahide Furukawa, Kawasaki (JP); Takeshi Oosawa, Yoshikawa (JP); Kaori Oosawa, legal representative, Yoshikawa (JP); Hidetaka Yajima, Tokyo (JP)

(73) Assignee: KABUSHIKI KAISHA TOSHIBA (JP)

( * ) Notice: Subject to any disclaimer, the term of this patent is extended or adjusted under 35 U.S.C. 154(b) by 311 days.

(21) Appl. No.: 13/613,802

(22) Filed: Sep. 13, 2012

(65) Prior Publication Data

US 2013/0333573 A1 Dec. 19, 2013

(30) Foreign Application Priority Data

Sep. 13, 2011 (JP) ................. 2011-199275

(51) Int. Cl.
*B01D 49/00* (2006.01)
*B01D 46/44* (2006.01)
*B01D 46/00* (2006.01)
*B01D 46/46* (2006.01)
*H02K 9/26* (2006.01)

(52) U.S. Cl.
CPC ............ *B01D 46/44* (2013.01); *B01D 46/0086* (2013.01); *B01D 46/446* (2013.01); *B01D 46/46* (2013.01); *H02K 9/26* (2013.01); *B01D 2273/30* (2013.01)

(58) Field of Classification Search
CPC ...... B01D 46/44; B01D 46/446; B01D 46/46; B01D 2273/30; H02K 9/26
USPC .................. 96/397, 411–412, 414–416, 417, 96/421–423
See application file for complete search history.

(56) References Cited

U.S. PATENT DOCUMENTS 2,372,135 A * 3/1945 Sterrett ......................... 310/57

FOREIGN PATENT DOCUMENTS

| JP | 55-63550 A | 5/1980 |
|---|---|---|
| JP | 55-133210 U | 9/1980 |
| JP | 55-133210 A | 10/1980 |
| JP | 57-3368 U | 1/1982 |
| JP | 57-159368 A | 10/1982 |
| JP | 57-159368 U | 10/1982 |
| JP | 61-202161 | 12/1986 |
| JP | 6-65699 A | 3/1994 |
| JP | 6-65699 U | 9/1994 |

OTHER PUBLICATIONS

Office Action from Japanese Patent Office dated Dec. 2, 2014 (and English Translation).
Office Action from Japanese Patent Office dated Dec. 2, 2014 (and English Translation, 4 pages).

* cited by examiner

*Primary Examiner* — Dung H Bui
(74) *Attorney, Agent, or Firm* — Harness, Dickey & Pierce, P.L.C.

(57) ABSTRACT

According to one embodiment, a dynamo-electric machine includes a rotor, a stator, a frame, a shaft sealing device, and a gas purity maintainer. The gas purity maintainer includes an expansion tank, a first mist collecting section, a valve unit, a drain pot, and an instrument panel. The first mist collecting section is provided in the middle of a scavenging pipe extending from the expansion tank to discharge a coolant gas from the expansion tank. A downstream in the first mist collecting section is higher than an upstream.

9 Claims, 9 Drawing Sheets

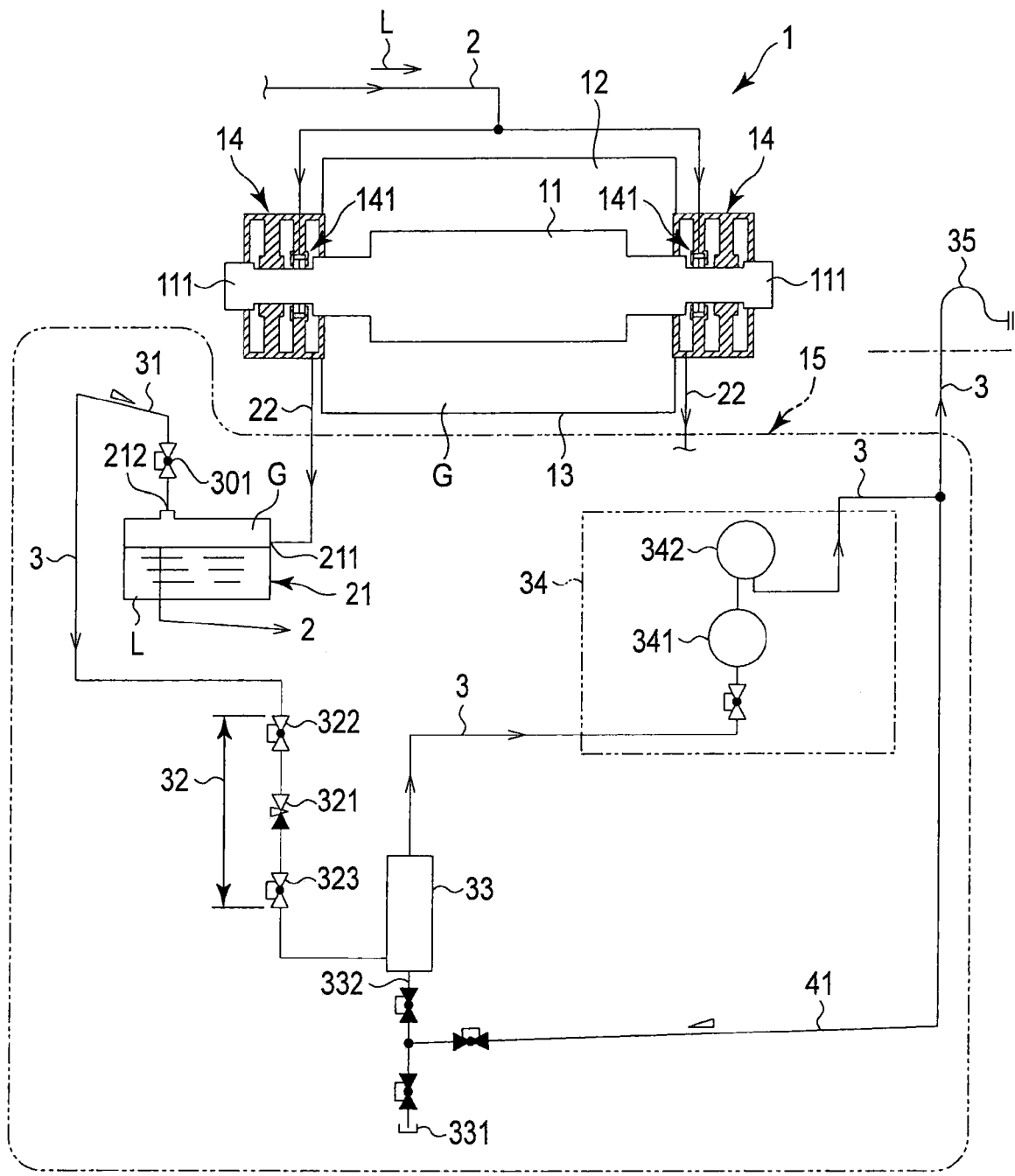
F I G. 1

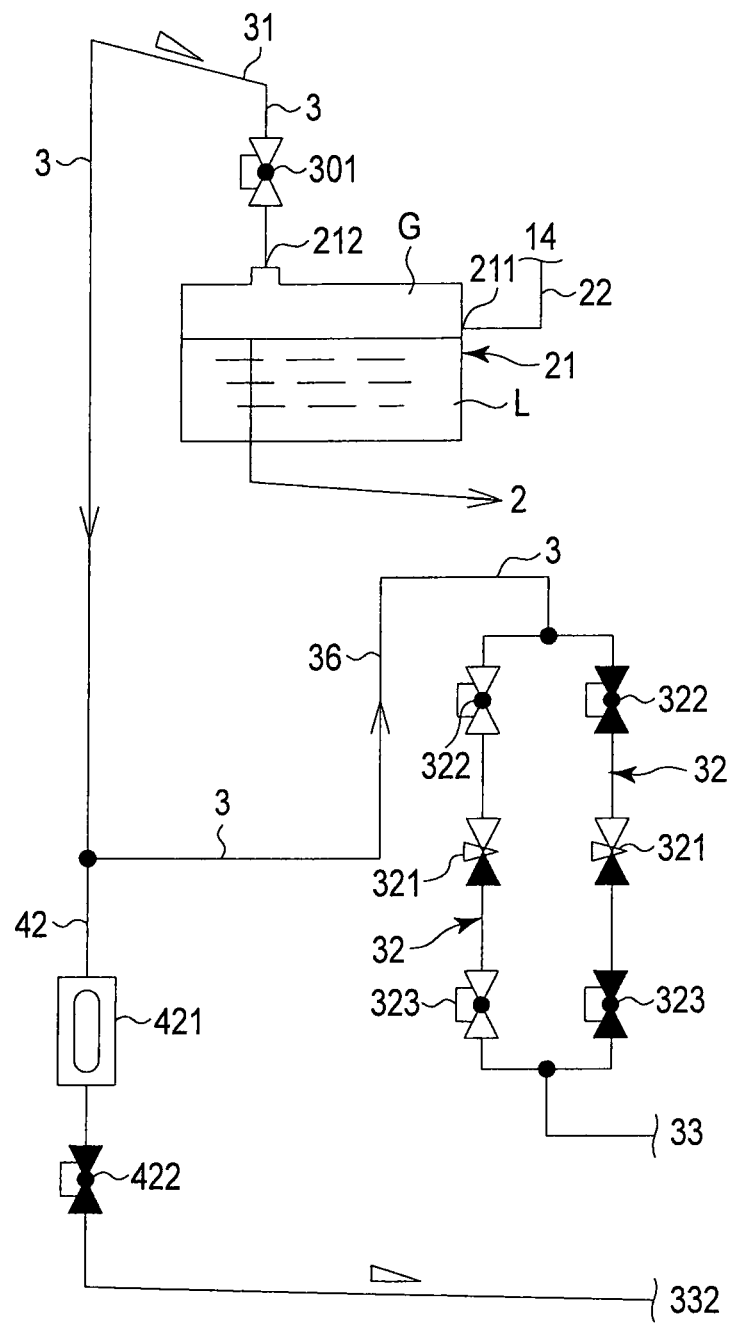
F I G. 6

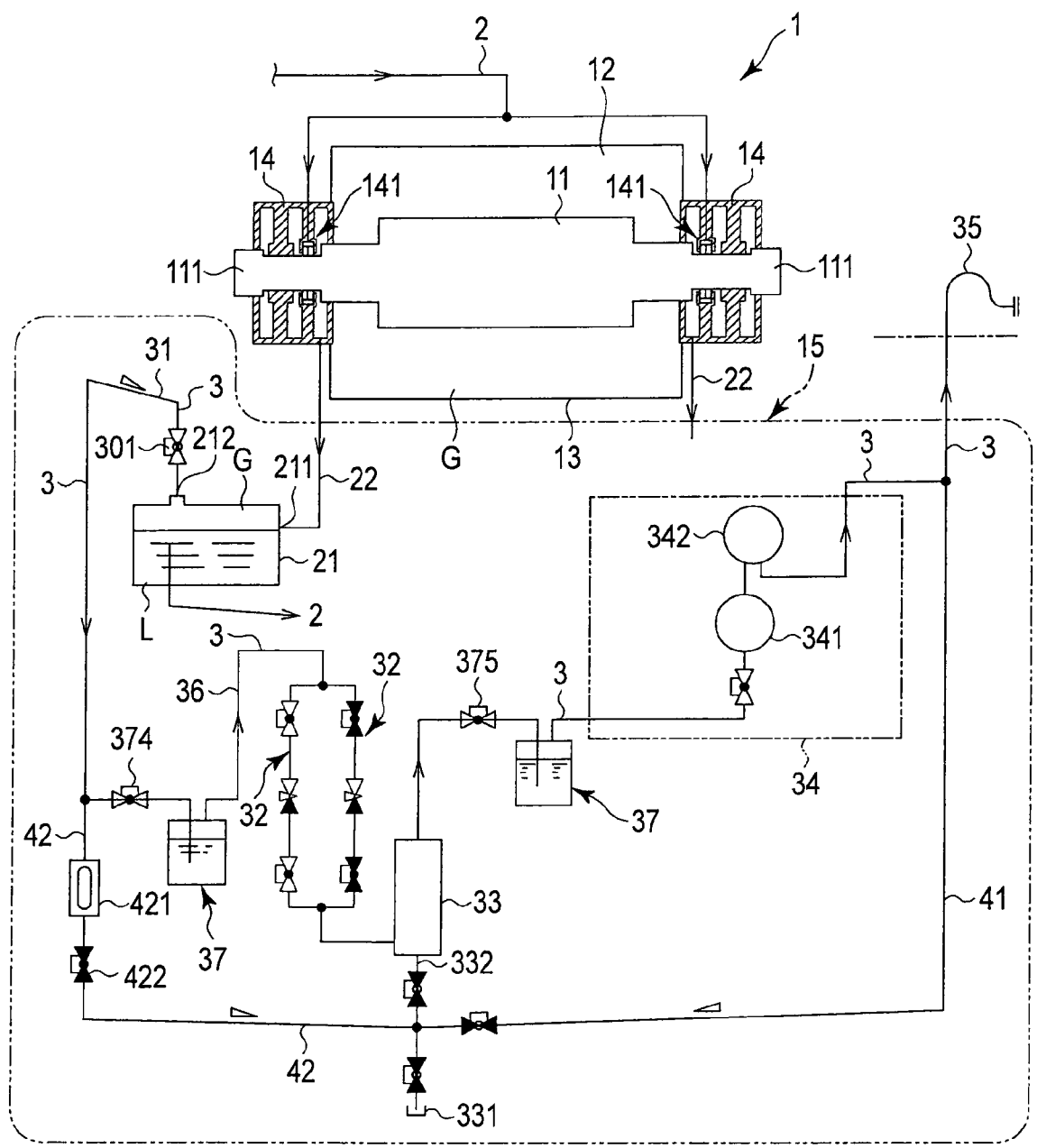
F I G. 8

DYNAMO-ELECTRIC MACHINE PROVIDED WITH GAS PURITY MAINTAINER

CROSS-REFERENCE TO RELATED APPLICATIONS

This application is based upon and claims the benefit of priority from Japanese Patent Application No. 2011-199275, filed Sep. 13, 2011, the entire contents of which are incorporated herein by reference.

FIELD

Embodiments described herein relate generally to a dynamo-electric machine provided with a device that maintains purity of a coolant gas sealed in a frame.

BACKGROUND

A dynamo-electric machine includes a rotor, a stator, a bearing, and a frame, and hydrogen gas is sealed as a coolant gas in the dynamo-electric machine. A shaft sealing device is provided at the bearing such that the coolant gas does not leak from the bearing. Sealing oil having a pressure higher than internal pressure of the dynamo-electric machine is supplied to the shaft sealing device through a sealing oil supply line. The sealing oil discharged from the shaft sealing device is collected and returned to the sealing oil supply line. The sealing oil, which flows and is discharged onto an air side of the bearing from the shaft sealing device, contains Gases, such as air. When the collected oil is circulated to the sealing oil supply line, the gases are dissolved from the sealing oil to gradually degrade purity of the hydrogen gas in the frame.

There are well known two systems that are provided in the sealing oil supply line in order to maintain the purity of the hydrogen gas. One of the systems is a vacuum treatment system in which the sealing oil supplied to the shaft sealing device is degassed with a vacuum treatment apparatus, and the other is a continuous scavenging system in which not the vacuum treatment apparatus but equipment is provided in order to maintain the purity of the hydrogen gas in the dynamo-electric machine.

For the gas purity maintainer in which the continuous scavenging system is adopted, the purity of the hydrogen gas in the dynamo-electric machine is gradually degraded because the sealing oil to which a vacuum treatment is not performed is supplied to the shaft seal device. Therefore, the purity of the gas is maintained by automatically supplying the new hydrogen gas having the high purity while a given amount of gas is continuously scavenged.

When the coolant gas is scavenged from a sealing oil treatment system by the continuous scavenging system in order to maintain the purity of the hydrogen gas that is of the coolant gas in the dynamo-electric machine, part of the sealing oil becomes mist having a fine particle size, and is mixed in the scavenged coolant gas. When the mist of the sealing oil is mixed in the scavenged coolant gas, the mist of the sealing oil adheres in the middle of the piping which transports the coolant gas, and returns to a liquid. The liquid of the sealing oil is accumulated in the piping. A needle valve that controls a scavenging flow rate and the pressure and an instrument panel in which gauges, such as a flowmeter and a purity meter, are placed are connected in the middle of the coolant gas scavenging piping. The flowmeter measures the scavenging flow rate, and the purity meter measures the purity of the hydrogen gas that is of the scavenged gas.

Particularly, when the mist invades in the needle valve and the gauges of the instrument panel, the liquid sealing oil is easily accumulated due to structures of the needle valve and the gauges. As a result, an error is generated in the flow rate controlled by the needle valve, or errors are generated in displays of the gauges. When the error is generated in the flow rate controlled by the needle valve, the scavenging flow rate of the coolant gas is decreases to degrade the purity of the hydrogen gas that is of the coolant gas. When the errors are included in the displays of the gauges, continuous scavenging operation cannot properly be performed because normal monitoring is not performed.

BRIEF DESCRIPTION OF THE DRAWINGS

FIG. 1 is a view schematically illustrating a dynamo-electric machine of a first embodiment;

FIG. 6 is a view illustrating a section from an expansion tank to a valve unit of a dynamo-electric machine of a sixth embodiment;

FIG. 8 is a view schematically illustrating a dynamo-electric machine of an eighth embodiment;

DETAILED DESCRIPTION

Figure 2:
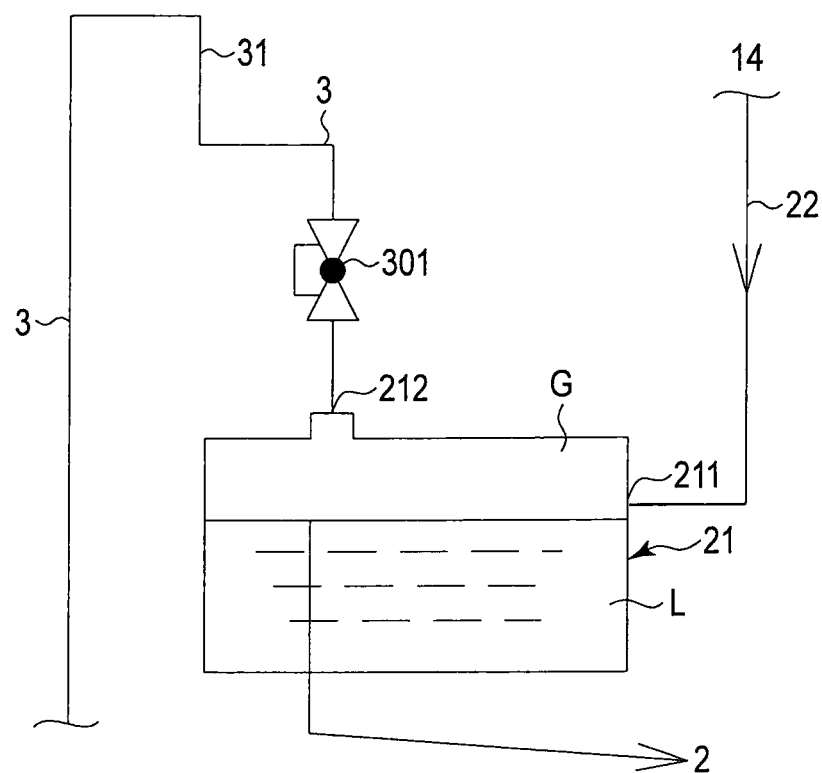
FIG. 2 is a view illustrating an expansion tank and a first mist collecting section of a dynamo-electric machine of a second embodiment.

A dynamo-electric machine according to an embodiment prevents mist of sealing oil from being carries onto a downstream along piping through which scavenged coolant gas is transported. The dynamo-electric machine includes a rotor, a stator, a frame, a shaft sealing device, and a gas purity maintainer. The frame accommodates the rotor and the stator therein, and an inside of the frame is filled with the coolant gas. The shaft sealing device is attached to an outer circumference of a shaft of the rotor, and the sealing oil having a pressure higher than a pressure of the coolant gas is supplied to the shaft sealing device. The gas purity maintainer is connected to a sealing oil supplying line which circulates the sealing oil discharged from the shaft seal device to the shaft seal device, and maintains purity of the coolant gas at a given value or more. The gas purity maintainer includes an expansion tank, a first mist collecting section, a valve unit, a drain pot, and an instrument panel. The expansion tank collects part of the coolant gas together with the sealing oil flowing out to a hydrogen filled side of the frame from the shaft sealing device, and the expansion tank separates and extracts the coolant gas mixed in the sealing oil. The first mist collecting section is provided in a middle of a scavenging pipe, which extends from the expansion tank, in order to exhaust the coolant gas in the expansion tank, and a downstream in the first mist collecting section is higher than an upstream. The valve unit is disposed on the downstream of the first mist collecting section to control a flow rate of the coolant gas. The drain pot is disposed on the downstream of the valve unit. The instrument panel is disposed on the downstream of the drain pot and comprises a flowmeter and a purity meter for the coolant gas.

A dynamo-electric machine 1 according to a first embodiment will be described with reference to FIG. 1. The dynamo-electric machine 1 shown in FIG. 1 includes a rotor 11, a stator 12, a frame 13, a bearing 14, and a gas purity maintainer 15. The rotor 11 and the stator 12 are accommodated in the frame 13. An inside of the frame 13 is filled with hydrogen gas used as a coolant gas G. The bearing 14 supports a shaft 111 of rotor 11 and includes a shaft sealing device 141 which is attached to an outer circumference of the shaft 111 to seal the coolant gas G.

The shaft sealing device 141A is supplied sealing oil L from a sealing oil supplying line 2 with a pressure higher than that of the coolant gas G. The shaft seal device 141 seals a gap between the shaft 111 of the rotor 11 and the frame 13 such that the sealing oil L is caused to flow out to both of an inside and an outside of the frame 13 along an outer surface of the shaft 111 of the rotor 11.

The gas purity maintainer 15 includes an expansion tank 21, a first mist collecting section 31, a valve unit 32, a drain pot 33, and an instrument panel 34. The gas purity maintainer 15 is connected to the sealing oil supplying line 2 which circulates the sealing oil L discharged from the shaft sealing device 141 to the shaft sealing device 141, and maintains purity of the coolant gas G at a given value or more.

The expansion tank 21 is placed at a level lower than the shaft sealing device 141, and includes an inflow port 211 at a level higher than a liquid level in the tank. The oil drain pipe 22 is connected to the inflow port 211. The expansion tank 21 collects the sealing oil L, which flows onto a hydrogen side of the bearing 14 from the shaft seal device 141, through the oil drain pipe 22. In the expansion tank 21, the part of coolant gas G mixed in the sealing oil L is separated and extracted. The expansion tank 21 and the oil drain pipe 22 constitute a route through which the sealing oil L is collected while the coolant gas G is partially scavenged as a scavenging gas.

The expansion tank 21 includes an exhaust port 212 in an upper portion far from the inflow port 211. A scavenging pipe 3 is connected to the exhaust port 212. The scavenging pipe 3 connects to the instrument panel 34 through the first mist collecting section 31, the valve unit 32, and the drain pot 33. The first mist collecting section 31 is connected to downstream of a bellows valve 301 that is attached to the scavenging pipe 3 extending upwardly vertically from the exhaust port 212 of the expansion tank 21. The first mist collecting section 31 is placed such that the downstream of the first mist collecting section 31 is higher than the upstream. In the first embodiment, the first mist collecting section 31 is sloped pipe that is placed with an up-grade such that a relative position becomes higher toward the downstream.

The valve unit 32 is disposed on the downstream of the first mist collecting section 31, and controls a scavenging flow rate of the coolant gas G. The valve unit 32 includes a needle valve 321 for controlling a flow rate and seal valves 322 and 323 placed on the upstream and downstream of the needle valve 321 respectively. In the first embodiment, bellows valves are used as the seal valves 322 and 323. The drain pot 33 is disposed on the downstream of the valve unit 32, and removes a mist and vapor of the sealing oil L in the coolant gas G. The coolant gas G passing through the drain pot 33 is sent to the instrument panel 34.

The instrument panel 34 includes a flowmeter 341 that measures the flow rate of the coolant gas G passing through the scavenging pipe 3 and a purity meter 342 that measures the purity of hydrogen gas of the coolant gas G being scavenged. The dynamo-electric machine 1 includes a management device for the coolant gas G, monitors the purity of the hydrogen gas as the coolant gas G in the frame 13 from a value of the purity meter 342 based on the flow rate and purity, which are measured in the instrument panel 34, and controls the flow rate of the coolant gas G for scavenging and the flow rate of the high-purity hydrogen gas supplied to the frame 13.

The coolant gas G passing through the instrument panel 34 is released from an atmospheric release pipe 35. The dynamo-electric machine 1 further includes a drain route 41 that is branched from a position, in which the atmospheric release pipe 35 and the instrument panel 34 are connected, to extend downward. The drain route 41 is connected in the middle of a drain route 332 of the drain pot 33, which leads to a drain reservoir 331.

According to the shaft sealing devices 141, the dynamo-electric machine 1 may include routes from the expansion tank 21 to the instrument panel 34 in order to scavenge the coolant gas G, or the routes may merge on the way.

In the dynamo-electric machine 1 including the above components, even if the mist of the sealing oil L that is mixed in the coolant gas G scavenged from the expansion tank 21 adheres to an inner wall of the first mist collecting section 31 and becomes a drip, the mist flows toward the upstream of the first mist collecting section 31 and returns to the expansion tank 21. Accordingly, the dynamo-electric machine 1 can prevent the mist of the sealing oil L from being carried to the valve unit 32 or the instrument panel 34, which prevents a malfunction caused by the sealing oil L accumulated in the needle valve 321 used as the flow rate control valve placed in the valve unit 32 or the flowmeter 341 and purity meter 342 of the instrument panel 34.

Dynamo-electric machine 1 according to second to ninth embodiments will be described below with reference to drawings. In each of the drawing, the component having the same function as the dynamo-electric machine 1 of the first embodiment is designated by the same numeral as the dynamo-electric machine 1 of the first embodiment, and the description refers the appropriate portion of the first embodiment. It is assumed that the component that is not described or illustrated in each embodiment or drawing is identical to that of the first embodiment, and FIG. 1 and the description is referred in each embodiment.

A dynamo-electric machine 1 according to a second embodiment will be described with reference to FIG. 2. As illustrated in FIG. 2, the dynamo-electric machine 1 of the second embodiment differs from that of the first embodiment in a shape of a first mist collecting section 31. The first mist collecting section 31 is ascending piping that vertically connects an upstream of scavenging pipe 3 extending upward from an expansion tank 21 and a downstream of scavenging pipe 3 leading to a valve unit 32.

Similarly to the first embodiment, even if the mist of the sealing oil L flowing out from the expansion tank 21 adheres to the inner wall of the first mist collecting section 31 and becomes the drip, the sealing oil L does not flow toward the valve unit 32 which is in the downstream of the first mist collecting section 31, but return to the expansion tank 21. An upstream end of the first mist collecting section 31 is vertically connected to the scavenging pipe 3. An orientation of the flow of the coolant gas G is bent at a substantially right angle in the connection portion. Therefore, the mist of the sealing oil L in the coolant gas G collides with a wall surface to facilitate the collecting.

Figure 3:
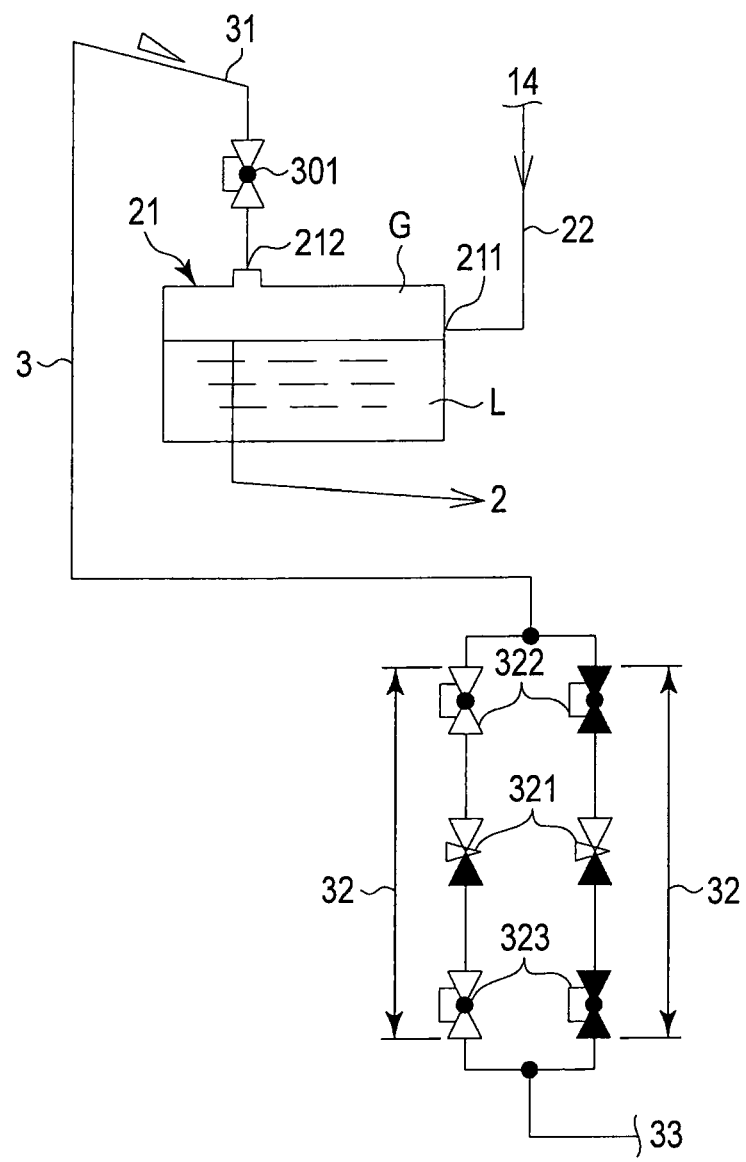
FIG. 3 is a view illustrating a section from an expansion tank to a valve unit of a dynamo-electric machine of a third embodiment.

A dynamo-electric machine 1 according to a third embodiment will be described with reference to FIG. 3. A first mist collecting section 31 in the dynamo-electric machine 1 of the third embodiment as shown in FIG. 3 is identical to that of the first embodiment. Two valve units 32 are provided in parallel. At least three valve units 32 may be provided in parallel depending on conditions, such as the flow rate of the coolant gas G being scavenged.

In the valve unit 32 of the dynamo-electric machine 1, a needle valve 321 can separately be detached by closing seal valves 322 and 323 disposed on the upstream and downstream. In the third embodiment, the two valve units 32 are provided in parallel, so that one of the valve units 32 can be detached for the purpose of maintenance or cleaning even if the dynamo-electric machine 1 is running. That is, it is not necessary to stop the dynamo-electric machine 1.

Figure 4:
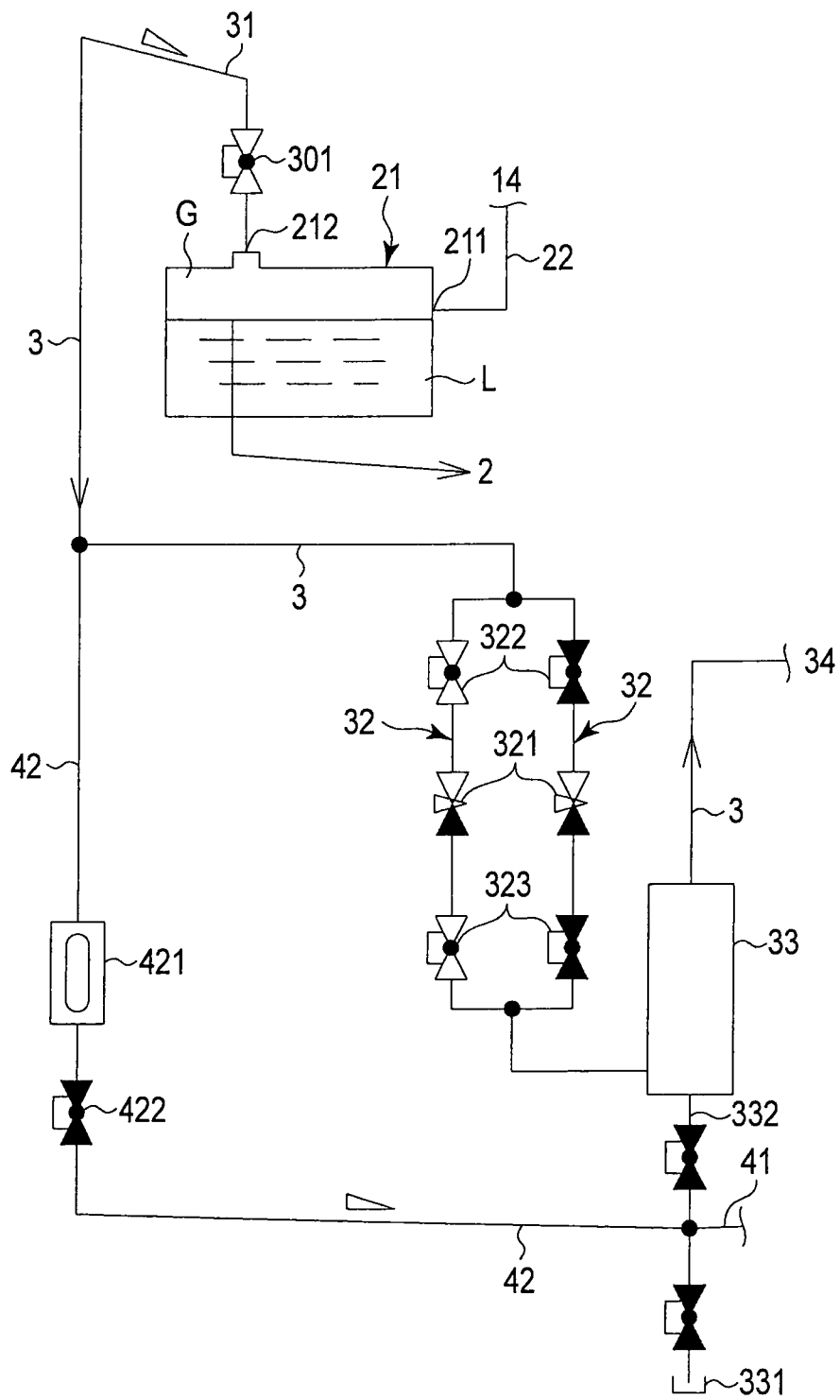
FIG. 4 is a view illustrating a section from an expansion tank to a drain pot of a dynamo-electric machine of a fourth embodiment.

A dynamo-electric machine 1 according to a fourth embodiment will be described with reference to FIG. 4. A gas purity maintainer 15 in the dynamo-electric machine 1 of the fourth embodiment, as shown in FIG. 4, further includes blow piping 42 that is branched from a point between the downstream of a first mist collecting section 31 and a valve unit 32 to extend downward. The blow piping 42 includes a sight glass 421 and a seal valve 422. The downstream of the blow piping 42 is connected in the middle of a drain route 332 of a drain pot 33 like a drain route 41. A bellows valve is applied for the seal valve 422. Similarly to the third embodiment, the two valve units 32 are provided in parallel.

Since the mist of the sealing oil L in the coolant gas G passing through the first mist collecting section 31 adheres to an inner surface of a scavenging pipe 3 extending downward from the first mist collecting section 31 and turns to the drip, the sealing oil L is accumulated in the blow piping 42 that is downwardly extended. As the blow piping 42 includes the sight glass 421, it can be checked that how much the sealing oil L is accumulated and it is easy to understand the time when the sealing oil L accumulated in the blow piping 42 must be discharged.

When the cleaning blow for periodically removing the sealing oil L accumulated in the blow piping 42 will be performed, the upstream seal valve 322 of the valve unit 32 is closed, and the seal valve 422 of the blow piping 42 is repeatedly opened and closed several times. The sealing oil L adhering to the inner surfaces of the scavenging pipe 3 and blow piping 42, which are located on the downstream of the first mist collecting section 31, is also blows by the coolant gas G scavenged from the inside of a frame 13.

The dynamo-electric machine 1 of the fourth embodiment includes the blow piping 42, so that how much the mist of the sealing oil L flows downward can be checked by the sight glass 421. Accordingly, in addition to the periodical maintenance in which the accumulated sealing oil L is blown, the time for blowing the accumulated sealing oil L is easily determined depending on the situation. Therefore, the malfunction of the valve unit 32 or indication failures of the flowmeter 341 and purity meter 342 of the instrument panel 34 can previously be prevented.

Figure 5:
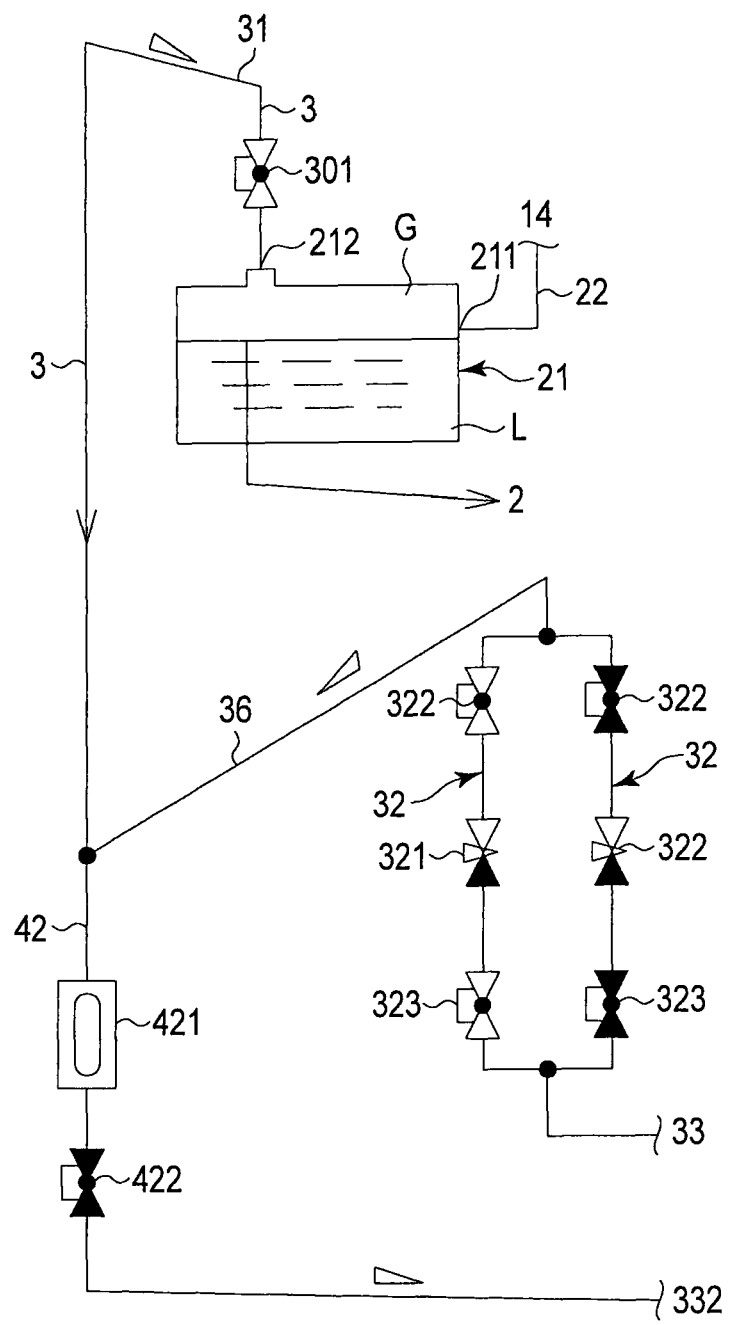
FIG. 5 is a view illustrating a section from an expansion tank to a valve unit of a dynamo-electric machine of a fifth embodiment.

A dynamo-electric machine 1 according to a fifth embodiment will be described with reference to FIG. 5. A gas purity maintainer 15 in the dynamo-electric machine 1 of the fifth embodiment, as illustrated in FIG. 5, includes a second mist collecting section 36 that is located between a position in which blow piping 42 is branched and a valve unit 32. The second mist collecting section 36 is provided such that the downstream of the second mist collecting section 36 is higher than the upstream in a relative position. The second mist collecting section 36 of the fifth embodiment is the sloped pipe that becomes the up-grade toward the downstream. Similarly to the third embodiment, the two valve units 32 are provided in parallel.

The mist of the sealing oil L adhering to the inner wall of the second mist collecting section 36 flows in and is accumulated in the blow piping 42. The sealing oil L accumulated in the blow piping 42 is discharged similarly to the fourth embodiment. Since the gas purity maintainer 15 includes the second mist collecting section 36, the sealing oil L, which adheres to the inner walls of the scavenging pipe 3 from the branched point of the blow piping 42 to the valve unit 32 and turns to the drip, can effectively be collected and discharged.

A dynamo-electric machined according to a sixth embodiment will be described with reference to FIG. 6. The dynamo-electric machine 1 of the sixth embodiment as shown in FIG. 6 differs from the dynamo-electric machine 1 of the fifth embodiment in that a second mist collecting section 36 is the ascending piping that vertically connects the upstream scavenging pipe 3 and the downstream scavenging pipe 3. A first mist collecting section 31 may be the ascending piping as the second embodiment instead of the sloped pipe in FIG. 6.

The dynamo-electric machine 1 of the sixth embodiment includes the second mist collecting section 36. Therefore, the sealing oil L, which adheres to the inner wall of the scavenging pipe 3 from the branched point of the blow piping 42 to the valve unit 32 and turns to the drip, can effectively be collected similarly to the fifth embodiment.

Figure 7:
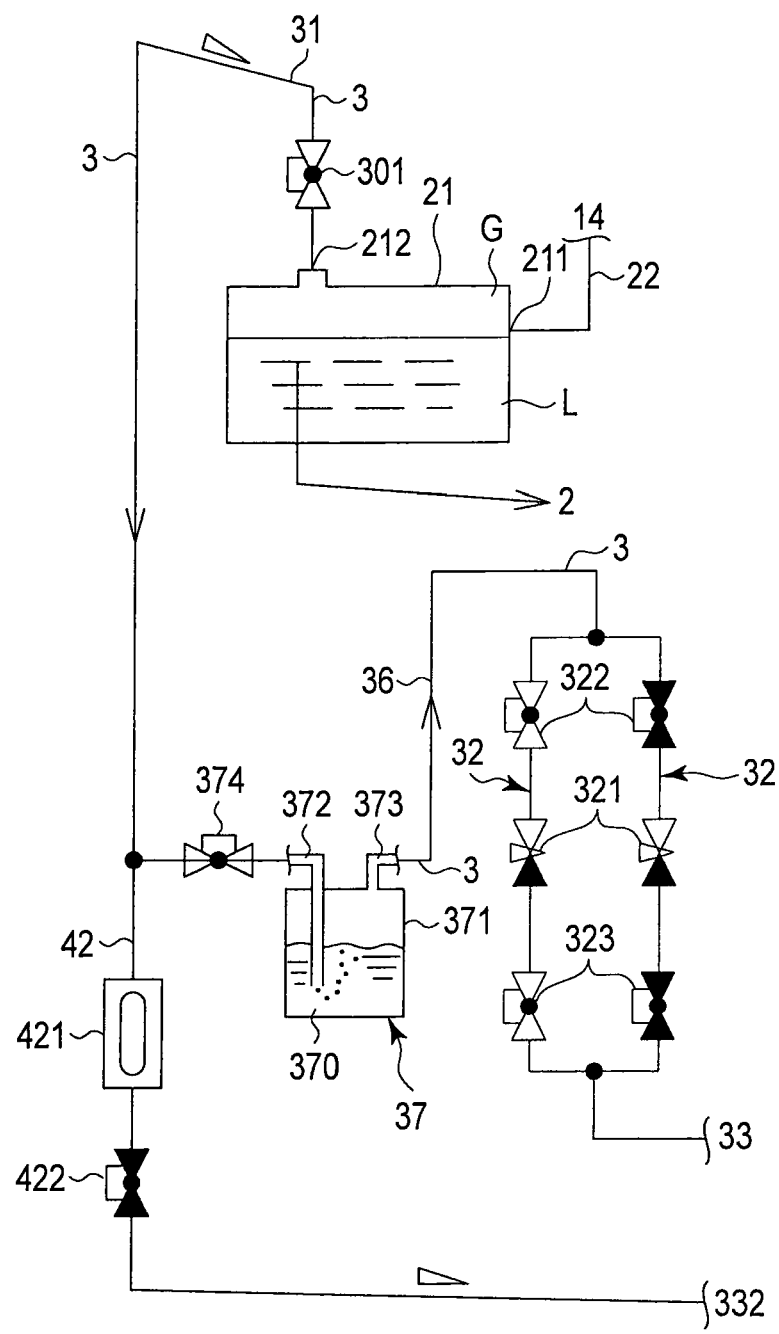
FIG. 7 is a view illustrating a section from an expansion tank to a valve unit of a dynamo-electric machine of a seventh embodiment.

A dynamo-electric machine 1 according to a seventh embodiment will be described with reference to FIG. 7. A gas purity maintainer 15 in the dynamo-electric machine 1 of the seventh embodiment as shown in FIG. 7 includes a mist trap 37 that is located between a point where the blow piping 42 is branched and a second mist collecting section 36. The mist trap 37 includes a container 371 in which an oil 370 having the same component as the sealing oil L is reserved, an inflow port 372 that is connected to an upstream of the scavenging pipe 3 and inserted in the oil 370, and an outflow port 373 that is connected to the downstream of the scavenging pipe 3 from above the liquid level of the oil 370.

A sealing valve 374 is also placed between the position where the blow piping 42 is branched and the mist trap 37. A bellows valve is applied for the sealing valve 374. When the sealing oil L accumulated in the blow piping 42 is discharged, the sealing valve 374 located on the upstream of the mist trap 37 is closed, and the seal valve 422 on the blow piping 42 is opened.

Since the gas purity maintainer 15 includes the mist trap 37, the mist of the sealing oil L included in the coolant gas G passed through the first mist collecting section 31 can be separated by the mist trap 37. The mist trap 37 is placed on the upstreams of the valve unit 32, drain pot 33, and instrument panel 34. Therefore the mist of the sealing oil L can be prevented from being carried to these instruments. An amount of oil mist passing through the valve unit 32 or the drain pot 33 is reduced. Hence, the number of maintenance or cleaning times of the valve unit 32 or the drain pot 33 can be reduced. Additionally, a probability of generating indication failures of measurement instruments, such as a flowmeter 341 and a purity meter 342, is significantly reduced by the reduction of the amount of oil mist reaching an instrument panel 34.

A dynamo-electric machine 1 according to an eighth embodiment will be described with reference to FIG. 8. In a gas purity maintainer 15 of the dynamo-electric machine 1 of the eighth embodiment as shown in FIG. 8, a mist trap 37 that is identical to the mist trap 37 in the gas purity maintainer 15 of the seventh embodiment is placed in a scavenging pipe 3 between a drain pot 33 and an instrument panel 34. A sealing valve 375 is placed on the upstream of the mist trap 37. The sealing valve 375 is closed, during the maintenance, to prevent oil 370 in the mist trap 37 from reversely flowing into the scavenging pipe 3.

The amount of mist of the sealing oil L reaching the instrument panel 34 is significantly reduced by placing the mist trap 37 between the drain pot 33 and the instrument panel 34.

Figure 9:
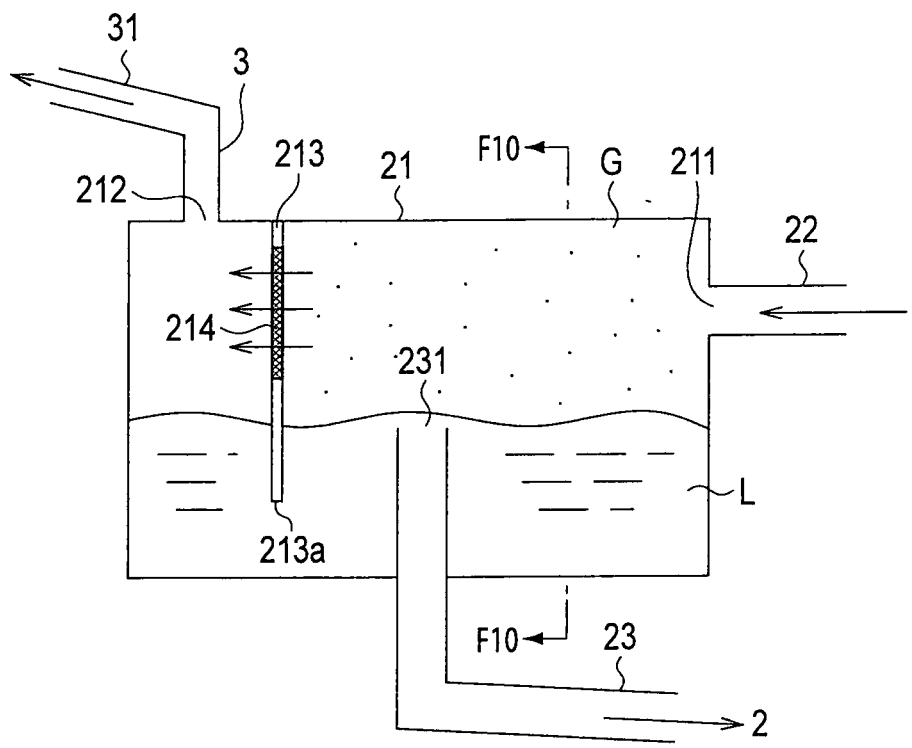
FIG. 9 is a view schematically illustrating a section of a dynamo-electric machine of a ninth embodiment.
Figure 10:
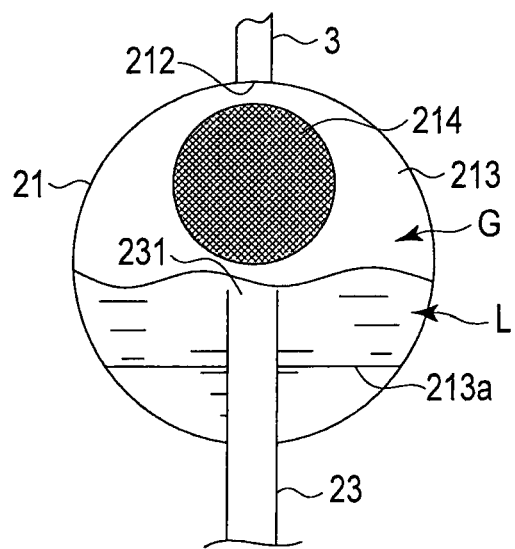
FIG. 10 is a sectional view taken on a line F10-F10 in FIG. 9.

A dynamo-electric machine 1 according to a ninth embodiment will be described with reference to FIGS. 9 and 10. An internal structure of an expansion tank 21 of a gas purity maintainer 15 in the dynamo-electric machine 1 of the ninth embodiment, as shown in FIGS. 9 and 10, differs from that of the expansion tank 21 of the first to eighth embodiments. The expansion tank 21 as shown in FIG. 9 includes a mist collector 213 that partitions an upper-side portion from at least an oil level, namely, a portion filled with the coolant gas G between an inflow port 211 and an exhaust port 212.

Specifically, a lower edge 213a of the mist collector 213 extends to a position lower than an opening 231 of an oil-collecting path 23. The oil collecting path 23 returns the sealing oil L accumulated in the expansion tank 21 to a sealing oil supply line 20. Therefore the lower edge 213a is submerged in the sealing oil L. The mist collector 213 includes an aeration filter 214 in a position higher than the oil level.

When a mesh of the aeration filter 214 is excessively fine, the aeration filter 214 becomes an aeration resistance of the coolant gas G, and the aeration filter 214 is clogged with the sealing oil L or generates new mist on the downstream by piping the clogged sealing oil L. Accordingly, the aeration filter 214 having an enough roughness for the mesh, which is not easily closed by a surface tension of the sealing oil L, is adopted.

The aeration filter 214 collects an oil drop, which jumps when the sealing oil L flows into the expansion tank 21, or the mist of the sealing oil L having a rage particle size included in the coolant gas G, and causes the coolant gas G to pass therethrough. The sealing oil L collected by the aeration filter 214 is accumulated in the expansion tank 21 along the mist collector 213. As the mist collector 213 is placed in the expansion tank 21 and collects the mist having the large particle size, it is reduces an absolute amount of the mist of the sealing oil L flowing onto the downstream of the expansion tank 21.

A mist collector, in which a flow channel as a labyrinth is formed by a vane instead of the aeration filter 214 and in which the coolant gas G including the mist of the sealing oil L is caused to pass through the flow channel to be collected the mist, may be adopted. Alternatively, a mist collector in which an electric field is generated by static electricity to attract the mist like an electric dust collector may be available when the sealing oil L has an electrical insulating property. A cyclone-system mist collector that generates a swirling flow to centrifuge the mist from the coolant gas G may be placed in front of the exhaust port 212.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A dynamo-electric machine comprising:
 a rotor;
 a stator;
 a frame configured to contain the rotor and the stator and to be filled with a coolant gas;
 a shaft sealing device attached to an outer circumference of a shaft of the rotor and configured to be supplied a sealing oil at a pressure higher than a pressure of the coolant gas; and
 a gas purity maintainer configured to be connected to a sealing oil supply line circulating sealing oil discharged from the shaft sealing device back to the shaft sealing device and to maintain purity of the coolant gas at a given value or more, the sealing oil received by the gas purity maintainer including coolant gas having exited the frame through the shaft sealing device;
 wherein the gas purity maintainer comprises:
 an expansion tank configured to collect a part of the coolant gas together with the sealing oil flowing in the frame from the shaft sealing device, and to separate the coolant gas mixed in the sealing oil for extracting the coolant gas;
 a first mist collecting section provided in a middle of a scavenging pipe extending from the expansion tank for scavenging the coolant gas in the expansion tank, the first mist collecting section configured to be tilted so as to be higher at a downstream end than at an upstream end in order to restrict sealing oil mist from passing downstream through the first mist collecting section;
 a valve unit provided on the downstream of the first mist collecting section and configured to control a flow rate of the coolant gas;
 a drain pot on the downstream of the valve unit; and
 an instrument panel disposed on the downstream of the drain pot and comprising a flowmeter and a purity meter for the coolant gas;
 wherein sealing oil, and sealing oil mist thereof, flowing from the shaft sealing device is prevented from passing to the instrument panel by the expansion tank, the first mist collection section, and the drain pot to protect the flowmeter and the purity meter from contamination so that purity of coolant gas having exited the frame by passing across the shaft sealing device and mixing with sealing oil can be accurately measured.

2. The dynamo-electric machine of claim 1, wherein the first mist collecting section is a sloped pipe that has an up-grade toward the downstream.

3. The dynamo-electric machine of claim 1, wherein at least two valve units are provided in parallel, and each of the valve units comprises a needle valve that controls the flow rate and sealing valves each of which is placed on the upstream and the downstream of the needle valve.

4. The dynamo-electric machine of claim 1, wherein the gas purity maintainer comprises blow piping that is branched from a point between the downstream of the first mist collecting section and the valve unit to extend downward.

5. The dynamo-electric machine of claim 4, wherein the gas purity maintainer comprises a second mist collecting section disposed between the point where the blow piping is branched and the valve unit, wherein the downstream of the second mist collecting section is higher than the upstream.

6. The dynamo-electric machine of claim 5, wherein the second mist collecting section is an ascending piping that vertically connects the upstream and the downstream.

7. The dynamo-electric machine of claim 4, wherein the downstream of the blow piping is connected onto a draining side of the drain pot.

8. The dynamo-electric machine of claim 4, wherein the blow piping comprises a sight glass, and a seal valve arranged on the downstream of the sight glass.

9. A dynamo-electric machine comprising:
   a rotor including a shaft;
   a stator;
   a frame configured to contain the rotor and the stator and to be filled with a coolant gas;
   a shaft sealing device attached to an outer circumference of the shaft of the rotor and configured to receive a sealing oil from a sealing oil supply line at a pressure higher than a pressure of the coolant gas;
   a gas purity maintainer configured to be connected to an oil drain pipe that is configured to direct to the gas purity maintainer coolant gas flowing from the shaft sealing device that has been mixed with the sealing oil, the sealing oil received by the gas purity maintainer including coolant gas having exited the frame through the shaft sealing device, the gas purity maintainer includes the following:
      an expansion tank configured to collect the coolant gas flowing from the shaft sealing device mixed with the sealing oil, and to separate the coolant gas from the sealing oil;
      a first mist collection section along a length of a scavenging pipe extending from the expansion tank for scavenging the coolant gas in the expansion tank, the first mist collection section configured to be tilted so as to be higher at a downstream end compared to an upstream end, so as to restrict sealing oil mist from passing downstream through the first mist collecting section;
      a valve unit at the downstream end of the first mist collecting section and configured to control flow rate of the coolant gas;
      a drain pot on the downstream end of the valve unit;
      an instrument panel disposed on the downstream end of the drain pot and including a flowmeter and a purity meter for the coolant gas;
      a second mist collecting section disposed between the valve unit and where the blow piping is branched, a downstream end of the second mist collecting section is higher than an upstream end of the second mist collecting section, the second mist collecting section including a vertical pipe configured to restrict passage of sealing oil drips therethrough;
   wherein the first and second mist collecting sections and the drain pot prevent both the flowmeter and the purity meter from being contaminated by sealing oil mixed with coolant gas flowing from the shaft sealing device to allow for accurate flow and purity measurements of the coolant gas over an extended period of time.

* * * * *